Patented Nov. 4, 1947

2,430,003

UNITED STATES PATENT OFFICE 2,430,003

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application April 2, 1945,
Serial No. 586,269

6 Claims. (Cl. 252—342)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The new material or compound herein described, particularly when employed as a demulsifying agent, consists of a water-soluble or water-wettable diol ester, which, in its simplest aspect, may be exemplified by a high molal monocarboxy acid mono- or diester of an oxyethylated di(hydroxyalkyloxyphenol)methane, with the proviso that if only one high molal acyl radical is present, there may be present one acyl radical derived from low molal monocarboxy acid having 7 carbon atoms or less, such as acetic acid, hydroxyacetic acid, butyric acid, heptoic acid, etc., but with the qualification that there must, in any event, be at least one high molal acyl radical. There is the additional proviso that there must be present at least one polyglycol radical containing at least 8 ether linkages.

Most of such compounds may be characterized by the following formula

in which R is a member of the class consisting of $R_1O(R_2O)_nH$, $R_1O(R_2O)_nOCR_6$ and
$$R_1O(R_2O)_nOCH_7$$
radicals, and in which $R_5$ is a member of the class consisting of methylene and substituted methylene radicals representing the residue of low molal aldehydes; $R_1$ is a substituted monocyclic phenol radical having 2 of the 3 reactive 2, 4, 6 positions substituted by 2 alkyl side chains, of which at least 1 contains at least 3 carbon atoms and the longest of which does not contain more than 8 carbon atoms; $R_2O$ is an alkylene oxide radical containing at least 2 and not more than 4 carbon atoms selected from the class consisting of ethylene oxide, propylene oxide, butylene oxide, glycide and methylglycide radicals; and $n$ is a whole number varying from 1 to 60; $R_6CO$ is the acyl radical of a low molal monocarboxy acid having not over 7 carbon atoms; $R_7CO$ is an acyl radical of a detergent-forming acid having at least 8 and not more than 32 carbon atoms, with the proviso that there be present at least 1 polyglycol radical containing at least 8 ether linkages, and there must be at least 1 occurrence of the acyl radical $R_7CO$.

Briefly stated, the preparation of the herein contemplated compounds consists in 2 or 3 steps, the last 2 of which may be interrupted so as to take place at different periods instead of successively. The two so referred to are oxyalkylation and esterification. The first step consists in reacting 2 moles of a properly selected substituted phenol with one mole of an aldehyde so as to produce a diphenylolmethane or substituted methane. The preferred aldehyde is formaldehyde, on account of its reactivity and low cost. Other aldehydes which may be used are acetaldehyde, propionaldehyde, butyraldehyde, and furfural. The condensation reactions of this type are well known and do not require description. In the case of furfural, it is desirable to use alkaline condensing agents, but in the other instances, acid or acidic substances are usually employed. Since these condensation reactions cannot produce resins in the usual sense, they are comparatively simple and result in oils varying from moderately viscous substances to oils so viscous as to appear to be almost solid.

The phenols are selected so that resinification does not take place insofar that the phenols are limited to types in which there is only one reactive nuclear hydrogen atom. Specifically, then, the phenols may be indicated by the following formula:

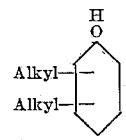

with the proviso that the two alkyl groups occupy two of the 2, 4, 6 positions, and that at least one of the alkyl side chains contains at least three carbon atoms and the longest alkyl side chain does not contain more than 8 carbon atoms. When 2 moles of such phenol are condensed in the customary manner with a reactive aldehyde, one obtains a substituted diphenylol methane or substituted methane of the following formula:

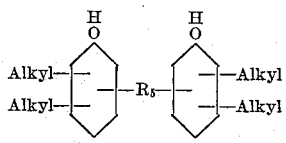

in which $R_5$ is a methylene radical, or a substituted methylene radical which represents the residue of an aldehyde and is preferably the unsubstituted methylene radical derived from formaldehyde.

As to various suitable phenols, we prefer to use 2-4-diamyl phenol or p-tert-butyl-o-cresol. Other suitable phenols include

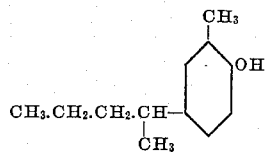

(1-methyl-butyl)-ortho-cresol

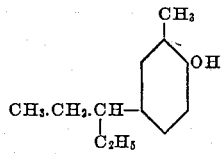

(1-ethyl-propyl)-ortho-cresol (See U. S. Patent No. 2,073,995, dated March 16, 1937, to Raiziss et al. See also U. S. Patent No. 2,106,760, dated February 1, 1938, to Raiziss et al.)

Other phenols can be prepared by the alkylation of ortho- or paracresol by the same procedure as is employed for the alkylation of phenol. (See U. S. Patent No. 2,060,573, dated November 10, 1936, to Hester.)

We have found that 2,4-dipropylphenol is also an excellent raw material. (See also U. S. Patents No. 2,064,885, dated December 22, 1936, to Carpenter, No. 2,104,412, dated January 4, 1938, to Buc, and 2,207,753, to Moyle et al., dated July 16, 1940.

It is understood that there is no objection to the presence of an additional alkyl radical provided its presence still leaves a reactive nuclear hydrogen atom. Such alkyl radical, if present, is limited to radicals having not over 8 carbon atoms, and must occupy one of the 3 or 5 positions. For all practical purposes, however, such compounds are derived from metacresol or similar homologues, and thus, for the sake of brevity in the hereto appended claims, such alkyl groups will be indicated as being in either the 3 position, or in the 5 position. For the sake of convenience, however, it is understood that the 3 and 5 positions are the obvious equivalents. One such example would be the product obtained by the propylation of metacresol. The meta group does not occupy a reactive position, and its presence does not interfere with the subsequent reaction. In a few instances compounds are obtainable where a cyclic radical may serve instead of an alkyl radical, for example, in 4-tert-butyl-2-phenylphenol or 4-tert-butyl-2-cyclohexylphenol.

Since the substituted phenols employed as reactants are invariably water-insoluble, and since formaldehyde, a water-soluble aldehyde, is the preferred reactant for introducing the methylene bridge or its equivalent, we have found it most desirable to employ the procedure described in U. S. Patent No. 2,330,217, dated September 28, 1943, to Hunn. Briefly stated, this procedure includes the use of an acid catalyst along with an emulsifying agent to promote emulsification, and thus reaction between the water-insoluble phenol and the water-soluble aldehyde. As an example of such procedure, the following is included:

PHENOL ALDEHYDE CONDENSATION

Example 1

|  | Pounds |
|---|---|
| Diamyl (2,4) phenol | 702 |
| Formalin 40% U. S. P. | 114 |
| Concentrated hydrochloric acid | 3.3 |
| Alkylated aryl sulphonic acid salt (Nacconal N. R. S. F.) | 3.3 |

The mixture is stirred vigorously under a reflux condenser at approximately 105° C. for approximately 2 hours. The temperature is then raised to approximately 150–160° C. and held at this temperature for about the same period of time. Afterwards, water is distilled over and eliminated. Part of the water may be conveniently distilled over while the reaction mass is being raised from the temperature of approximately 105° C. to 150° C., or thereabouts, or while it is being held at approximately 150° C.

PHENOL ALDEHYDE CONDENSATION

Example 2

The same procedure is employed as in the previous example, except that 534 pounds of dipropyl(2,4)phenol replaces the 702 pounds of diamylphenol used in the preceding example.

PHENOL ALDEHYDE CONDENSATION

Example 3

The same procedure is followed as in the two previous examples, except that one uses a mixture consisting of 351 pounds of diamyl(2,4) phenol and 267 pounds of dipropyl(2,4) phenol. The result of such a mixture is that the condensate is also a mixture, of which one-third corresponds to Example 1, preceding, one-third to Example 2, preceding, and the remaining third represents the type of compound in which the phenol nuclei are different, one being an amylated nucleus and the other a propylated nucleus, or approximately such proportions.

Due to ready availability, and other desirable properties, it is particularly convenient and economical to replace dipropyl(2,4) phenol with an equivalent amount of 4,6-di-tertiary-butyl-m-cresol which is indicated by the following formula:

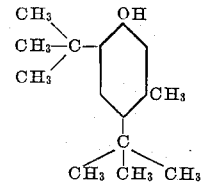

Instead of using the emulsification procedure, one may, of course, employ another well known method, to wit, the use of an alkaline catalyst in excess, particularly in amounts sufficient to dissolve or solubilize the water-insoluble phenol. Usually, a 10% sodium hydroxide solution is used to dissolve the substituted phenol. For complete details see, for example Industrial & Engineering Chemistry, volume 24, No. 4, page 442; volume 29, No. 8, page 860; and No. 11, pages 1125 and 1305. Particular attention is directed to volume 29, No. 8, page 862. The author of all these articles is F. S. Granger.

It is well known that various hydroxy hydrocarbon compounds, for instance, long chain alcohols, hydroxylated alicyclic compounds, phenols, and the like, can be treated with material such as ethylene oxide, propylene oxide, butylene oxide, amylene oxide, glycide, epichlorhydrin, and the like, to produce glycol ethers. For purposes of convenience, reference to an alkylene oxide is intended to mean the type commonly referred to as an alpha-beta alkylene oxide, i. e., where an oxygen atom represents a linkage between two adjacent carbon atoms, although the oxygen linkage does not necessarily involve a terminal carbon atom. Any functional equivalents, such as glycide, epichlorhydrin, or the like, are intended to be included within the expression "alkylene oxide," as employed in the hereto appended claims. The introduction of the polymerized alkylene oxide chain or recurring ether linkage converts a water-insoluble phenol of the kind described into a water-soluble product.

Oxyalkylation of water-insoluble hydroxy hydrocarbons of the kind previously referred to, in order to render the same water-soluble, and more particularly, in order to render them surface-active, is a well known procedure. An alkylene oxide may be added in gaseous or liquid phase to the liquid or melted phenolic body of the kind described at a temperature at which the alkylene oxide is absorbed by the phenol and which generally lies between 50° C. and 250° C. It is usually preferable to cause the phenolic body to react with the selected alkylene oxide in a closed vessel so constructed that suitable pressure may be employed, for instance, a pressure varying, for example, from 100 pounds gauge pressure to 1,000 pounds gauge pressure. It is often desirable to apply heat in the initial stage of the reaction and then depend on the heat of reaction to complete combination. In some instances, it is necessary to slow the reaction speed by means of a suitable cooling system. In these reactions the length of the polyglycol ether chain is determined by the proportion of alkylene oxide caused to react. In any event, the amount employed must be sufficient to produce water solubility, but not in such proportions that surface activity is lost. This particular point will be discussed in detail subsequently. It is well known that various catalysts may be employed for the formation of the polyethers; and the particularly desirable catalysts will include caustic alkalies, alkali alcoholates, tertiary non-hydroxylated organic bases, and the like; and furthermore, in some instances at least, acid compounds, such as potassium bisulfate may be employed.

The phenols employed are diphenylol methanes or higher methane homologues. Their structure has been previously characterized by the following formula, in which R₅ has its previous significance:

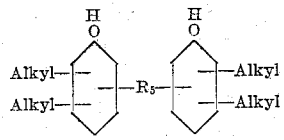

The method of preparation has been previously indicated, and involves a phenol aldehyde, and particularly, a phenol formaldehyde condensation reaction.

It is to be noted that such phenolic body is water-insoluble prior to treatment with an alkylene oxide, and that it becomes water-soluble upon treatment with an alkylene oxide, or its equivalent. It should be noted that the treatment with an alkylene oxide, or its equivalent, is necessary in all instances to produce water solubility, or at least, self-emulsifiability; yet excessive treatment should be avoided, in that the compound may become too hydrophile. Generally speaking, it is safe to treat the water-insoluble phenol with ethylene oxide, so as to increase its weight not less than 150%, and usually, not more than 250%, and possibly 300% in some cases. Such procedure is generally a satisfactory guide; and if some other alkylene oxide is employed, for instance, propylene oxide, then, of course, an increased amount of alkylene oxide must be employed, based on the increased molecular weight of the propylene oxide, and the like, and also based on the fact that its solubilizing effect per mole is somewhat less than that of ethylene oxide. If too great an amount of ethylene oxide is used, the resultant product passes through a water-soluble, surface-active stage, and then reaches an advanced stage where it is water-soluble, but substantially free from surface activity. Generally speaking, 12 to 30 moles of ethylene oxide, or the equivalent, per mole of substituted methane, is sufficient. As the carbon atoms in the alkyl chain increase, for instance, where a disubstituted cresol instead of the analogous phenol is employed, and particularly, in conjunction with a higher aldehyde, the amount must be increased.

Another convenient guide is that for each carbon atom present in the original water-insoluble phenol-substituted methane, one must add one-half molecular proportion of ethylene oxide, and possibly a greater amount, when an alkylene oxide of higher molecular weight is employed. It must also be remembered that the solubility of the product obtained varies somewhat with the method of manufacture and the particular catalyst which is present. It may be well to indicate that this is one of the reasons that the exact composition of the compounds cannot be indicated, as satisfactorily as might be desired in all instances. If solubility is not obtained with any other alkylene oxide, then ethylene oxide should be employed, because it appears to be best suited, for the reason that it reacts most readily, and because it promotes water solubility to a greater degree than other alkylene oxides, or the equivalent. Glycide, of course, or a similar compound is just as satisfactory as ethylene oxide. In any event, water solubility can always be obtained; and the range of surface activity is such that there is no difficulty in stopping short of the point where surface activity will disappear, due to the presence of unusually excessive hydrophile properties.

In the oxyalkylation of the phenol, allowance must be made for the hydrophobe character introduced by the high molal monocarboxy acid radical, such as a higher fatty acid. Such fatty acid radical does require an additional amount of hydrophile property, in order to render the ester water-wettable, self-emulsifiable, or water-soluble. In other words, just sufficient ethylene oxide, for example, is introduced so as to give the formaldehydic reactant the desired hydrophobe properties, then obviously, if such diol is reacted with a higher fatty acid, the ester so obtained would have decreased hydrophile properties, which may or may not be sufficient for the intended purpose. This is readily understandable by reference to a water-soluble oxyethylated phenol of the kind employed herein as a reactant. If such product is extremely water-soluble and then reacted, for example, with oleic acid, the resultant ester may be much less water-soluble, but be still more than sufficiently so for an intended purpose.

One convenient procedure is to merely introduce an alkanol radical or its equivalent into the diphenolic reactant. After this, one of the alkanol groups can be esterified with a high molal acid, such as a higher fatty acid, and afterwards, the fractional ester can be subjected to further oxyalkylation. In any event, as a guide to the amount of oxyalkylation required to solubilize a higher fatty acid, or any higher molal monocarboxy acid, reference is made to the following patent: U. S. Patent No. 2,307,058, dated January 5, 1943, to Moeller.

It may be well to emphasize what has been said previously in regard to surface activity of the water-soluble compound. If a dilution of the water-soluble reaction product of one part in 3,000, or 1 part in 5,000, or 1 part in 20,000, no longer shows any decrease in the surface tension of the resulting solution, as compared with the raw water from which it was prepared, then one has obtained a water-soluble product from the parent water-insoluble material; but surface activity has been destroyed, due to the introduction of an extremely hydrophilic property. Needless to say, such product should be removed and the changes made in the introduction of the alkylene oxide along the lines previously indicated, so as to obtain a product which is water-soluble, water-wettable, or self-emulsifiable, and also surface-active. In order that it be understood that such extremely hydrophilic compounds are not contemplated for use in the herein described process for resolving petroleum emulsions, it should be noted that the hereto appended claims are limited to the surface-active type.

Furthermore, it is to be pointed out that the products herein contemplated are not limited to any particular method of manufacture. It may be desirable to react the ethylene oxide with the selected phenolic bodies in several stages, and to test the material at the end of each stage. In other words, oxyalkylation may be carried out in a two-stage process, a three-stage process, a four-stage process, or the like. This will be obvious to a person skilled in the art. Furthermore, it is not necessary that all stages be carried out with the same alkylene oxide. For instance, the first stage might be conducted with propylene oxide, or butylene oxide, and subsequent stages, with ethylene oxide.

The type of compound free from acyl radicals may be exemplified by the following:

Oxyalkylated Diol

Example 1

200 parts of a condensation product, such as that exemplified by "Phenol aldehyde condensation, Example 1" is treated with approximately 150 pounds of ethylene oxide in two 75-pound portions, in the presence of one-half of 1% of sodium methylate; as the reaction proceeds, the sodium methylate either dissolves or is converted into a soluble compound by chemical combination. Reaction is conducted at approximately 125° C., and 100-200 pounds gauge pressure for approximately 2½ to 4 hours, until the reaction appears to be complete, as indicated by the pressure dropping to zero. The initial reaction conducted between one mole of the condensate and two moles of ethylene oxide, may be indicated thus:

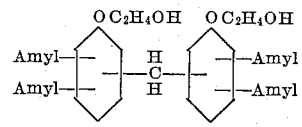

Oxyalkylated Diol

Example 2

The same procedure is followed as in the preceding example, except that a third portion of ethylene oxide, 75 pounds, by weight, is employed in addition.

Oxyalkylated Diol

Example 3

The same procedure is followed as in the prior example, except that a fourth addition of ethylene oxide (75 pounds) is introduced. The product so obtained represents an increase in weight, due to ethylene oxide equivalent to 150%, by weight, of the original phenolic reactant.

Oxyalkylated Diol

Example 4

The same procedure is followed as in the prior example, except that instead of employing the phenolic aldehyde condensation product, exemplified by Example 1, preceding, one employs instead an equal weight (200 pounds) of a condensation product exemplified by either "Phenol aldehyde condensation, Example 2," or by "Phenol aldehyde condensation, Example 3."

Oxyalkylated Diol

Example 5

One follows the same procedure as in Examples 1, 2 and 3, preceding, except that one prepares a phenol aldehyde condensation product following the derivative made under the heading "Phenol aldehyde condensation, Example 1," except that an equimolecular amount of 4,6-ditertiary-butyl-m-cresol is used instead of diamyl (2,4) phenol.

Oxyalkylated Diol

Example 6

The same procedure is employed as in the five preceding examples, except that propylene oxide is used, and in each addition the amount is one-third more than the equivalent amount of ethylene oxide used. For instance, 240 pounds of propylene oxide are employed instead of 175 pounds of ethylene oxide, or 100 pounds of propylene oxide are used instead of 75 pounds of ethylene oxide.

Oxyalkylated Diol

Example 7

The same procedure is followed as in Examples 1 to 5, preceding, except that butylene oxide is employed instead of ethylene oxide; for instance, instead of 175 pounds of ethylene oxide, one employs 286 pounds of butylene oxide, and instead of 75 pounds of ethylene oxide, one employs 122.5 pounds of butylene oxide.

It has been pointed out previously, that if desired, one of the hydroxyl radicals of the diols may be esterified with monocarboxy acids having seven carbon atoms or less. Such derivatives modify the hydrophile hydrophobe balance to a slight degree, and in some instances, give enhanced surface-active effect, particularly when used as a demulsifier. It has been suggested that such improvement for some purpose resides in decreasing or eliminating formation of the hydrogen bond or bridge between two molecules of the same compound. For instance, compare with the difference in certain properties of ethylene glycol and ethylene glycol monoacetate or ethylene glycol diacetate.

Previous reference has been made to detergent-forming monocarboxy acids having 8 to 32 carbon atoms. Obviously, one can use not only the acids, but their equivalents, such as the anhydrides, acyl chlorides, esters, etc.

It is well known that certain monocarboxy acids containing 8 carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R'COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

Although any of the high molal monocarboxy acids can be converted into derivatives of the kind described, it is our preference to employ compounds derived from higher fatty acids, rather than petroleum acids, rosin acids, and the like. We have found that by far the most effective demulsifying agents are obtained from unsaturated fatty acids having 18 carbon atoms. Such unsaturated fatty acids include the higher fatty acids, such as oleic acid, ricinoleic acid, linoleic acid, linolenic acid, etc. One may employ mixed fatty acids, as, for example, the fatty acids obtained by hydrolysis of cottonseed oil, soyabean oil, corn oil, etc. When our new product or compound is intended to be used as a demulsifier for resolving petroleum emulsions of the water-in-oil type, it is preferably obtained from fatty acids, and more specifically, unsaturated fatty acids.

OXYALKYLATED DIOL FRACTIONAL ESTER

*Example 1*

An oxyalkylated diol, as, for example, a product of the kind described under the heading "Oxyalkylated diol, Example 1" is analyzed to determine the hydroxyl value. To a suitable amount of diol, for instance, 300 pounds, there is added sufficient oleic acid to react with one and only one of the two hydroxyl radicals. This esterification is conducted in the usual manner, using a temperature of 180° to 200° C., or thereabouts, and if desired, one may add a small amount of catalyst, for instance, ½% of toluene sulfonic acid or alkyl phosphoric acid, or the like. Dry hydrochloric acid gas may also be used as the catalyst. The completeness of reaction can be predetermined, if desired, by condensation of the water, or else by a hydroxyl determination during the course of reaction. As has been previously pointed out, the surface-active effect of the diol is frequently enhanced, at least for some purposes, by conversion into a fractional ester in the manner indicated.

OXYALKYLATED DIOL FRACTIONAL ESTER

*Example 2*

The same procedure is followed as in the preceding example, but instead of using a diol of the kind exemplified by "Oxyalkylated diol, Example 1," there is employed instead a diol of the kind exemplified under the headings "Oxyalkylated diol Examples 2 to 7," inclusive.

OXYALKYLATED DIOL FRACTIONAL ESTER

*Example 3*

The same procedure is followed as in the two preceding examples, except that other higher fatty acids, either saturated or unsaturated, such as palmitic acid, stearic acid, linoleic acid, ricinoleic acid, or the like, are employed instead of oleic acid. Similarly, naphthenic acid or abietic acid may be employed.

OXYALKYLATED DIOL FRACTIONAL ESTER

*Example 4*

Reactions of the kind previously described are conducted, using the acyl chloride instead of the acid, with the liberation of hydrochloric acid instead of water. For instance, oleyl chloride or stearyl chloride, or a naphthenyl chloride, is used instead of oleic acid or stearic acid or naphthenic acid. The acyl chloride should be added slowly to the dihydroxyalkyloxyphenyl methane, with constant and vigorous stirring. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally, this means use of proper cooling devices, or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

In many instances, reactions of the kind previously described can be conducted most readily by cross-esterification, sometimes referred to as "alcoholysis." For instance, instead of using the free acid as an acylating agent, one may use the ethyl or methyl ester and cause reaction to take place in the presence of a catalyst, such as approximately ½% of alkali and ½% of a lead manganese or cobalt salt, such as the naphthenate or oleate. Lead naphthenate is particularly effective. Such reactions can be conducted at approximately 150° C. to 190° C. by the addition of a high-boiling solvent, such as xylene, or decalin. After refluxing for approximately 3 to 5 hours, the solvent is distilled over and the low molal alcohol eliminated at the same time.

As has been suggested previously, the reaction between the diol and high molal monocarboxy acid may be so conducted that one obtains a total or complete ester, rather than a fractional ester. As a matter of fact, the reaction to produce the complete ester can be conducted more readily than that to produce a fractional ester, for the reason that an excess of the acylating agent is not objectionable, particularly if it is removed at the end of the reaction. The use of the methyl or ethyl esters is particularly desirable, for the reason that the excess ester can be removed at the end of the reaction, by the use of vacuum distillation. The formation of complete or total esters may be illustrated in the following examples:

OXYALKYLATED DIOL TOTAL ESTER

*Example 1*

The same diol is used as described under the heading "Oxyalkylated diol fractional ester, Example 1." Having determined the hydroxyl value, one adds a comparatively large excess of methyloleate, methylstearate, methylnaphthenate, or the like, for instance, 4 to 6 moles of the ester for each mole of the diol. One also adds an amount of decalin equal to 50%, by volume, of the reaction mixture. The reaction is then conducted by refluxing for approximately 3 to 5 hours, in the presence of ½%, by weight, of lead naphthenate. At the end of this period of time, the decalin, methyl alcohol and excess ester are distilled off, preferably under vacuum. Such procedure yields a total or complete ester.

OXYALKYLATED DIOL TOTAL ESTER

*Example 2*

The same procedure is employed as in the preceding example, except that one employs as reactants the various diols described under the headings "Oxyalkylated diol, Examples 2 to 7," inclusive.

Other suitable procedures suggested by the foregoing directions may be employed. In some instances, the acyl chloride may be used and the excess reactant distilled off without decomposition.

It has been previously pointed out that a fractional ester of the kind described above may be reacted with a low molal carboxy acid, as well as a high molal carboxy acid, and thus, the second acyl radical that was introduced represents the acyl radical of a low molal monocarboxy acid having 7 carbon atoms or less, such as acetic acid, butyric acid, hydroxyacetic acid, lactic acid, etc. Preparation of such mixed total esters may be exemplified in the following manner:

OXYALKYLATED DIOL MIXED TOTAL ESTER

*Example 1*

One pound mole of an "Oxyalkylated diol fractional ester," as exemplified by Example 1, preceding, is reacted with an excess of acetic anhydride in the usual manner, so as to give a mixed total ester. The acetic acid formed during the reaction and any unreacted acetic anhydride is removed by distillation, preferably under vacuum. This esterification is conducted in the usual manner, using a temperature of 120° C., or thereabouts, and if desired, one may add a small amount of catalyst, for instance, ½% of toluene sulfonic acid, or alkyl phosphoric acid, or the like. Dry hydrochloric acid gas may also be used as a catalyst. The completeness of reaction can be predetermined, if desired, by condensation of the water, or else by a hydroxyl determination during the course of reaction.

OXYALKYLATED DIOL MIXED TOTAL ESTER

*Example 2*

The same procedure is followed as in the preceding example, but instead of using a diol of the kind exemplified by "Oxyalkylated diol, Example 1," there is employed instead a diol of the kind exemplified by the subsequent examples, for instance, materials described under the headings "Oxyalkylated diol, Examples 2 to 7," inclusive.

OXYALKYLATED DIOL MIXED TOTAL ESTER

*Example 3*

The same procedure is followed as in the two preceding examples, except that other monocarboxy low molal acids having 7 carbon atoms or less are employed instead of acetic acid. Such acids include, among others, hydroxyacetic, lactic, butyric, propionic, heptoic, etc.

OXYALKYLATED DIOL MIXED TOTAL ESTER

*Example 4*

Reactions of the kind previously described are conducted, using the acyl chloride instead of the acid with the liberation of hydrochloric acid instead of water. For instance, acetyl chloride may be used instead of acetic acid. The acyl chloride should be added slowly to the dihydroxyalkyloxyphenyl methane with constant and vigorous stirring. Hydrochloric acid is formed and should be vented and disposed of in a suitable manner. If the reaction does not take place promptly, the temperature should be raised moderately; for instance, 5° to 15° C., or a bit higher, until the reaction proceeds smoothly. However, as soon as the reaction does start, the temperature should be lowered until the reaction proceeds at the slowest feasible rate. Generally this means use of proper cooling devices or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

If it so happens that the higher fatty acid or equivalent high molal acid employed is hydroxylated, as in the case of ricinoleic acid, hydroxystearic acid, etc., there is a possibility and a probability that reaction with the low molal acid will take place, at least in part, with the alcohol radical of such high molal acyl radical, rather than with the alkanol radical. Such possibility can be eliminated by employing a non-hydroxylated low molal acid and first producing a fractional ester from such acid and the diol, and then follow by esterification with one mole of the high molal monocarboxy acid or its equivalent. The manufacture of the oxyalkylated diol low molal fractional esters are illustrated by the following procedures:

OXYALKYLATED DIOL LOW MOLAL FRACTIONAL ESTER

Example 1

An oxyalkylated diol, as, for example, a product of the kind described under the heading "Oxyalkylated diol, Example 1" is analyzed to determine the hydroxyl value. To a suitable amount of diol, for instance, 300 pounds, there is added sufficient anhydrous acetic acid to react with one and only one of the two hydroxyl radicals. This esterification is conducted in the usual manner, using a temperature of 120° C., or thereabouts, and if desired, one may add a small amount of catalyst, for instance, one-half percent of toluene sulfonic acid, or alkyl phosphoric acid, or the like. Dry hydrochloric acid gas may also be used as the catalyst. The completeness of reaction can be predetermined, if desired, by condensation of the water, or else by a hydroxyl determination during the course of reaction. As has been previously pointed out, the surface-active effect of the diol is frequently enhanced at least for some purposes, by conversion into a fractional ester in the manner indicated.

OXYALKYLATED DIOL LOW MOLAL FRACTIONAL ESTER

Example 2

The same procedure is followed as in the preceding example, but instead of using a diol of the kind exemplified by "Oxyalkylated diol, Example 1," there is employed instead a diol of the kind exemplified by the subsequent examples, for instance, materials described under the headings "Oxyalkylated diol, Examples 2 to 7," inclusive.

OXYALKYLATED DIOL LOW MOLAL FRACTIONAL ESTER

Example 3

The same procedure is followed as in the two preceding examples, except that other monocarboxy low molal acids having 7 carbon atoms or less are employed instead of acetic acid. Such acids include, among others, hydroxyacetic, lactic, butyric, propionic, heptoic, etc.

OXYALKYLATED DIOL LOW MOLAL FRACTIONAL ESTER

Example 4

Reactions of the kind previously described are conducted using the acyl chloride instead of the acid, with the liberation of hydrochloric acid instead of water. For instance, acetyl chloride may be used instead of acetic acid. The acyl chloride should be added slowly to the dihydroxyalkyloxyphenyl methane, with constant and vigorous stirring. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally this means use of proper cooling devices or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

Having obtained oxyalkylated diol low molal fractional esters, as exemplified by Examples 1 to 4, preceding, one need only subject such reactant to the action of the properly selected compound, so as to introduce the high molal acid radical in substantially the identical manner, as described under the headings "Oxyalkylated diol fractional ester, Examples 1, 2, 3 and 4." In other words, high molal acids, including abietic acid, naphthenic acid, higher fatty acid, and particularly those having hydroxyl radicals in the acyl group, may be reacted following previous directions for the production of the oxyalkylated diol fractional ester.

Attention is directed to the fact that the previous examples are the type in which the molecule may be considered as a symmetrical molecule from the standpoint that the nucleus has two polyglycol side chains, both of which are the same length, or substantially the same length. This applies without restriction as to whether or not a low molal monocarboxy acyl group is introduced or not. Obviously, however, by conducting the oxyalkylation in more than one step, or more specifically, in two steps, one can obtain the type of compound in which the hydrophile polyglycol radical is entirely on one side of the central nucleus, or divided irregularly between two side chains.

Such variants are illustrated in the following examples:

NON-SYMMETRICAL FRACTIONAL ESTER

Example 1

The same procedure is followed as in the manufacture of the "Oxyalkylated diol, Example 1," except that only two moles of the oxyalkylating agent, such as ethylene oxide, are employed. Such reaction may be illustrated in the following manner:

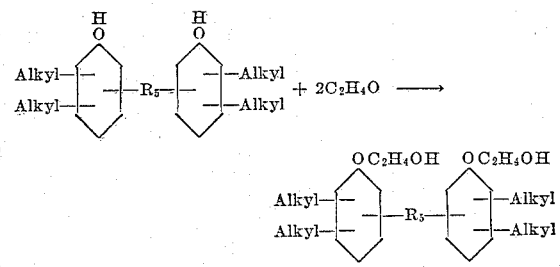

Having obtained such diol, the product is then esterified with any one of the low molal acids or acyl chlorides previously described, so as to yield the fractional ester. The reaction may be exemplified by the use of acetic acid in the following manner:

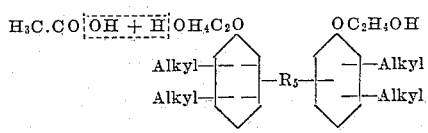

Fractional esters of the kind just described, obtained from any of the various phenol aldehyde condensation products, plus any oxyalkylating agent and any low molal monocarboxy acid of the kind described, can be employed to give the homologue or analogue of the particular fractional ester depicted in the last formula immediately preceding. Such product can then be treated with any predetermined amount of an oxyalkylating agent and then subjected to reaction with a high molal acid, or its equivalent, as previously described. For reasons of brevity, such description will not be repeated, since it is obviously the same reaction which has been described in detail previously. Similarly, the type of product exemplified by the following formula:

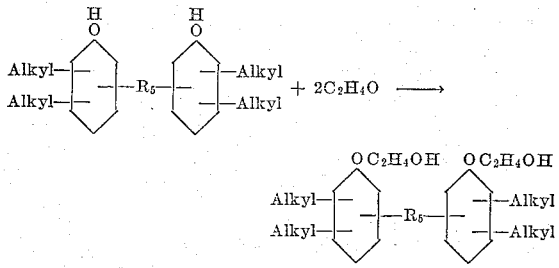

may be reacted with one mole of a high molal fatty acid, or its equivalent, and then with a suitable amount of an oxyalkylating agent, such as ethylene oxide. Such fractional esters can then be reacted, if desired, with a low molal monocarboxy acid, or its equivalent. It is obvious that by following the above procedures, one can produce a variety of non-symmetrical esters, in which all of the ether linkages may occur on one side of the central nucleus, or may be un-symmetrically divided on each side. For instance, one may have one-fifth of the total on one side, and four-fifths on the other, or one-fourth on one side and three-fourths on the other, or one-third on one side and two-thirds on the other, or two-fifths on one side and three-fifths on the other, or, if desired, the division may be symmetrical along the lines indicated previously.

In summary, then, the compounds herein contemplated are characterized by the following formula $$R—R_5—R$$

in which R is a member of the class consisting of $R_1O(R_2O)_nH$, $R_1O(R_2O)_nOCR_6$ and $R_1O(R_2O)_nOCR_7$ radicals, and in which $R_5$ is a member of the class consisting of methylene and substituted methylene radicals representing the residue of low molal aldehydes; $R_1$ is a substituted monocyclic phenol radical having 2 of the 3 reactive 2, 4, 6 positions substituted by 2 alkyl side chains, of which at least one contains at least 3 carbon atoms and the longest of which does not contain more than 8 carbon atoms; $R_2O$ is an alkylene oxide radical containing at least 2 and not more than 4 carbon atoms selected from the class consisting of ethylene oxide, propylene oxide, butylene oxide, glycide and methylglycide radicals; and $n$ is a whole number varying from 1 to 60; $R_6CO$ is the acyl radical of a low molal monocarboxy acid having not over 7 carbon atoms; $R_7CO$ is an acyl radical of a detergent-forming acid having at least 8 and not more than 32 carbon atoms, with the proviso that there be present at least one polyglycol radical containing at least 8 ether linkages, and there must be at least one occurrence of the acyl radical $R_7CO$. The new materials herein described form the subject-matter of our co-pending divisional application Serial No. 630,976, filed November 26, 1945.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process for resolving emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000 in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial values, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate, or the like, to render the mud susceptible to reaction with hydrochloric acid, or the like, and thus expedite its removal.

One preferred and more narrow aspect of our invention, insofar as it is concerned with demulsification of petroleum emulsions of the water-in-oil type, is concerned with the admixture of the oxyalkylated diol esters, as described, with a viscosity-reducing solvent, such as the various solvents enumerated, particularly aromatic solvents, alcohols, ether alcohols, etc., as previously specified. The word "solvent" is used in this sense, to refer to the mixture, if more than one solvent is employed, and generally speaking, it is our preference to employ the demulsifier in a form representing 40% to 85% demulsifier and 15% to 60% solvent, largely, if not entirely, non-aqueous and so selected to give a solution or mixture particularly adaptable for proportional pumps or other measuring devices. The following examples will illustrate this aspect of our invention:

DEMULSIFIER

Example 1

| | Per cent |
|---|---|
| Oxylated diol fractional ester, Example 1 | 60 |
| Xylene | 20 |
| Methyl alcohol | 20 |

DEMULSIFIER

Example 2

| | Per cent |
|---|---|
| Oxyalkylated diol total ester, Example 1 | 65 |
| Denatured alcohol | 10 |
| Ethylene glycol diethyl ether | 25 |

DEMULSIFIER

Example 3

| | Per cent |
|---|---|
| Oxyalkylated diol mixed total ester, Example 1 | 55 |
| Denatured alcohol | 25 |
| Diethylene glycol monoethyl ether | 15 |
| Water | 5 |

The above percentages are by weight.

Having thus described our invention, what we claim as new and desire to secure by Letters Patent is:

1. A process for breaking petroleum emulsions of the water-in-oil type, characterized by subjecting the emulsion to the action of a demulsifier comprising a surface-active hydrophile compound of the formula:

$$R-R_5-R$$

in which R is a member of the class consisting of $R_1O(R_2O)_nH$, $R_1O(R_2O)_nOCR_6$ and $$R_1O(R_2O)_nOCR_7$$

radicals, and in which $R_5$ is a member of the class consisting of methylene and substituted methylene radicals representing the residue of low molal aldehydes; $R_1$ is a substituted monocyclic phenol radical having 2 of the 3 reactive 2, 4, 6 positions substituted by 2 alkyl side chains, of which at least 1 contains at least 3 carbon atoms and the longest of which does not contain more than 8 carbon atoms; $R_2O$ is an alkylene oxide radical containing at least 2 and not more than 4 carbon atoms selected from the class consisting of ethylene oxide, propylene oxide, butylene oxide, glycide and methylglycide radicals; and $n$ is a whole number varying from 1 to 60; $R_6CO$ is the acyl radical of a low molal monocarboxy acid having not over 7 carbon atoms; $R_7CO$ is an acyl radical of a detergent-forming acid having at least 8 and not more than 32 carbon atoms, with the proviso that there be present at least one polyglycol radical containing at least 8 ether linkages, and there must be at least one occurrence of the acyl radical $R_7CO$.

2. The process of claim 1, wherein the alkylene oxide radical is the ethylene oxide radical.

3. The process of claim 1, wherein the alkylene oxide radical is the ethylene oxide radical and all alkyl radicals are amyl radicals.

4. The process of claim 1, wherein the alkylene oxide radical is the ethylene oxide radical, all alkyl radicals are amyl radicals, and there is present two occurrences of $R_7CO$.

5. The process of claim 1, wherein the alkylene oxide radical is the ethylene oxide radical, all alkyl radicals are amyl radicals, and there is present one occurrence of $R_7CO$.

6. The process of claim 1, wherein the alkylene oxide radical is the ethylene oxide radical, all alkyl radicals are amyl radicals, and there is present one occurrence of $R_7CO$ and one occurrence of $R_6CO$.

MELVIN DE GROOTE.
BERNHARD KEISER.

REFERENCES CITED

The following references are of record in the file of this patent:

UNITED STATES PATENTS

| Number | Name | Date |
|---|---|---|
| 1,990,985 | Fonrobert et al. | Feb. 12, 1935 |
| 2,278,838 | De Groote et al. | Apr. 7, 1942 |
| 2,282,557 | Bruson | May 12, 1942 |
| 2,322,494 | Wirtel et al. | June 22, 1943 |
| 2,330,474 | De Groote | Sept. 28, 1943 |
| 2,331,265 | Coleman et al. | Oct. 5, 1943 |
| 2,385,970 | De Groote et al. | Oct. 2, 1945 |